United States Patent
Lengsfield, III et al.

(10) Patent No.: US 7,443,630 B2
(45) Date of Patent: Oct. 28, 2008

(54) APPARATUS, SYSTEM, AND METHOD FOR WRITING MAGNETICALLY ENCODED DATA TO DISCRETE LANDS

(75) Inventors: Byron Hassberg Lengsfield, III, Gilroy, CA (US); Andreas Moser, San Jose, CA (US); Walter Eugene Weresin, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 378 days.

(21) Appl. No.: 11/279,072

(22) Filed: Apr. 7, 2006

(65) Prior Publication Data

US 2007/0236820 A1    Oct. 11, 2007

(51) Int. Cl.
G11B 5/596 (2006.01)
(52) U.S. Cl. .................................. 360/77.02
(58) Field of Classification Search ........................ None
See application file for complete search history.

(56) References Cited

U.S. PATENT DOCUMENTS

| | | | | |
|---|---|---|---|---|
| 4,068,268 | A | 1/1978 | Idemoto et al. | 360/78 |
| 4,419,700 | A | 12/1983 | Ragle et al. | 360/77 |
| 4,644,421 | A | 2/1987 | Miwa et al. | 360/66 |
| 5,568,331 | A * | 10/1996 | Akagi et al. | 360/77.07 |
| 6,185,063 | B1 | 2/2001 | Cameron | 360/78.04 |
| 6,529,341 | B1 | 3/2003 | Ishida et al. | 360/48 |
| 6,757,126 | B1 * | 6/2004 | Kuroda et al. | 360/77.02 |
| 7,082,007 | B2 * | 7/2006 | Liu et al. | 360/77.02 |
| 7,106,549 | B2 * | 9/2006 | Asakura | 360/77.06 |
| 7,133,241 | B2 * | 11/2006 | Che et al. | 360/75 |
| 7,158,340 | B2 * | 1/2007 | Tagami et al. | 360/78.08 |
| 7,203,025 | B2 * | 4/2007 | Kaizu et al. | 360/77.08 |
| 7,324,295 | B2 * | 1/2008 | Teguri et al. | 360/51 |
| 2002/0071198 | A1 | 6/2002 | Liu et al. | 360/77.02 |
| 2003/0179481 | A1 | 9/2003 | McNeil et al. | 360/48 |
| 2004/0136113 | A1 | 7/2004 | Soeno | 360/97.01 |
| 2005/0068664 | A1 | 3/2005 | Kasiraj et al. | 360/78.08 |
| 2005/0069298 | A1 | 3/2005 | Kasiraj et al. | 386/125 |
| 2005/0071537 | A1 | 3/2005 | New et al. | 711/100 |
| 2007/0008639 | A1* | 1/2007 | Tagami et al. | 360/77.08 |
| 2007/0174582 | A1* | 7/2007 | Feldman | 711/202 |

FOREIGN PATENT DOCUMENTS

| | | |
|---|---|---|
| JP | 97143 | 1/1997 |
| JP | 9305964 | 11/1997 |
| JP | 2000331433 | 11/2000 |
| JP | 3142707 | 6/2001 |

* cited by examiner

*Primary Examiner*—Hoa T. Nguyen
*Assistant Examiner*—James L Habermehl
(74) *Attorney, Agent, or Firm*—Kunzler & McKenzie

(57) ABSTRACT

An apparatus, system, and method are disclosed for writing magnetically encoded data. A servo module positions a write head relative to a first land such that a first edge of the write head is positioned substantially over a first land edge of the first land. The write head has a radial width greater than the sum of a radial width of the first land and radial widths of interior and exterior grooves such that the write head is also positioned over at least a portion of a second adjacent land. The write head writes magnetically encoded data to the first land. The servo module further positions the write head relative to a second land such that the first edge of the write head is positioned substantially over a second land edge of the second land and the write head is not positioned over the first land.

25 Claims, 9 Drawing Sheets

APPARATUS, SYSTEM, AND METHOD FOR WRITING MAGNETICALLY ENCODED DATA TO DISCRETE LANDS

BACKGROUND OF THE INVENTION

1. Field of the Invention

This invention relates to recording magnetic media and more particularly relates to writing magnetically encoded data to discrete lands.

2. Description of the Related Art

Hard disk drives ("HDD") are widely used to store digital data for enterprise data processing systems, computer workstations, portable computing devices, digital audio players, digital video players, and the like. In addition, there is strong economic pressure for HDD to store increasingly more data at lower cost. For example, increasing the data stored in a HDD can reduce the operational costs of a storage subsystem by storing more data in a rack of HDD. In addition, there is demand for storing increasing amounts of audio and video data in portable digital audio and video players.

The HDD stores data on a disk with a surface of magnetic material. A write head magnetically polarizes areas of the magnetic material with one or two polarities to encode either binary zeros or ones. Thus data is recorded as magnetically encoded areas or bits of magnetic polarity. An HDD read head detects the magnetic polarity of each bit or area and generates an electrical signal that approximates the magnetic polarity. The signal is processed to recover the binary data recorded on the magnetic material.

The amount of data that an HDD can store and the cost of storing data is a largely a function of the areal density of the HDD. The areal density is a measure of the bits of data encoded per unit area. For example, areal density may be measured as gigabits of data per square inch ($Gb/in^2$). The HDD typically stores more data as the areal density increases. In addition, the cost per byte of data stored typically decreases as the areal density increases. Therefore, increasing the areal density of a HDD is highly desirable.

The areal density of the HDD is dependent in part on the strength of a magnetic field generated by the write head that polarizes the magnetic material. Generally, a stronger magnetic field is able to write data with a higher areal density. The strength of the magnetic field is limited in part by the size of the write head. For geometric reasons larger write heads can produce larger magnetic fields and gradients needed for greater areal densities.

Unfortunately, larger write heads write to larger areas of magnetic material, decreasing areal density. In addition, as the areal density increases, the read head increasingly detects the magnetic polarities of adjacent areas of magnetic material along with the magnetic polarity of the area of magnetic material being read. The magnetic polarities of adjacent magnetic material areas are a component of noise. Noise includes background phenomena that are added to the read head signal that are unrelated to the data bit being read. As the areal density increases, the noise increases, increasing the difficulty of recovering data from the read head signal.

HDD have been constructed with a plurality of discrete radial areas of raised magnetic material referred to herein as tracks or lands. The lands are separated by grooves that may not include magnetic material and that are recessed from the read head. The grooves do not store magnetic data and so are the source of little noise while the read head reads data from the lands. As a result, data is more easily recovered from HDD with discrete lands as the noise from the grooves is reduced.

Unfortunately, the size of the write head is restricted by the size of the lands and grooves. The radial width of the write head cannot be so large that it polarizes an adjacent land while polarizing a target land. Therefore, although the use of discrete lands increases areal density, discrete lands may also limit areal density by limiting the size of write heads for writing magnetically encode data to the lands.

From the foregoing discussion, it should be apparent that a need exists for an apparatus, system, and method that write magnetically encoded data to discrete lands using a write head with a radial width greater than the radial width of each land. Beneficially, such an apparatus, system, and method would increase the areal density of data written to a HDD.

SUMMARY OF THE INVENTION

The present invention has been developed in response to the present state of the art, and in particular, in response to the problems and needs in the art that have not yet been fully solved by currently available methods for writing magnetically encoded data. Accordingly, the present invention has been developed to provide an apparatus, system, and method for writing magnetically encoded data that overcome many or all of the above-discussed shortcomings in the art.

The apparatus to write magnetically encoded data is provided with a plurality of modules configured to functionally execute the steps of positioning a write head and writing magnetically encoded data. These modules in the described embodiments include a write head and a servo module.

The write head writes magnetically encoded data to a first land. The first land is disposed radially upon a disk with a plurality of radially disposed lands. In addition, each land is bounded by an interior radial groove and an exterior radial groove. In one embodiment, each land has a substantially equivalent radial width and each groove has a substantially equivalent radial width. Magnetic material is disposed upon the lands. A magnetic field from the write head may polarize the magnetic material on the lands to encode data.

The write head has a radial width greater than the sum of a radial width of the first land and radial widths of the interior and exterior grooves. In one embodiment, the write head radial width is in the range of the sum of the radial width of the first land and the radial widths of the interior and exterior grooves to the sum of three times the radial width of the first land and the radial widths of the interior and exterior grooves multiplied by two.

The servo module positions the write head relative to the first land such that the first edge of the write head is positioned substantially over a first land edge of the first land. The write head writes magnetically encoded data to the first land while positioned over the first land. The write head is also positioned in whole or in part over a second land adjacent to a groove bounding the first land. The write head writes the magnetically encoded data to at least a portion of the second land while writing the magnetically encoded data to the first land.

In one embodiment, the servo module further positions the write head relative to the second land such that the first edge of the write head is positioned substantially over a second land edge of the second land and the write head is not positioned over the first land. The write head may write magnetically encoded data to the second land, overwriting any previously written data on the second land without overwriting data on the first land. Thus the apparatus may sequentially write data to a plurality of discrete lands using a write head with a radial width larger than the radial width of the lands, supporting increased areal density.

A system of the present invention is also presented to write magnetically encoded data. The system may be embodied in an HDD. In particular, the system, in one embodiment, includes a disk, a write head, and a servo module.

The disk includes a plurality of lands disposed radially upon the disk. Each land is bounded by an interior radial groove and an exterior radial groove. In one embodiment, two or more lands are grouped as a lands group. The lands of the lands group may be written together sequentially. In a certain embodiment, a first lands group is separated from a second lands group by a boundary with a radial width at least substantially equivalent to the radial width of the write head minus the width of the last land. The boundary may be a land. Alternatively, the boundary may be a groove.

The servo module positions the write head relative to a first land such that a first edge of the write head is positioned substantially over a first land edge of the first land. The write head writes magnetically encoded data to the first land. The servo module further positions the write head relative to a second land adjacent to a groove bounding the first land such that the first edge of the write head is positioned substantially over a second land edge of the second land and the write head is not positioned over the first land. The write head may write magnetically encoded data to the second land. The system supports increased areal density for the disk by writing data to discrete lands with a write head with a radial width that at least exceeds the radial width of a land.

A method of the present invention is also presented for writing magnetically encoded data. The method in the disclosed embodiments substantially includes the steps to carry out the functions presented above with respect to the operation of the described apparatus and system. In one embodiment, the method includes positioning a write head over a first land, writing magnetically encoded data to the first land, and positioning the write head over a second land.

In one embodiment, a servo module groups two or more lands of a plurality of lands as a lands group. The servo module positions a write head relative to a first land of the lands group such that a first edge of the write head is positioned substantially over a first land edge of the first land. The write head has a radial width greater than the sum of a radial width of the first land and radial widths of the interior and exterior grooves such that the write head is also positioned over at least a portion of a second adjacent land. The write head writes magnetically encoded data to the first land. The servo module further positions write head relative to the second land such that the first edge of the write head is positioned substantially over a second land edge of the second land and the write head is not positioned over the first land. In one embodiment, the write head writes magnetically encoded data to the second land. The method increases writes data to discrete lands using a write head with a radial width that exceeds the radial width of a land.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention writes magnetically encoded data to discrete lands using a write head with a radial width that exceeds the radial width of a land and adjacent grooves. In addition, the embodiment of the present invention supports an increased areal density for each land. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
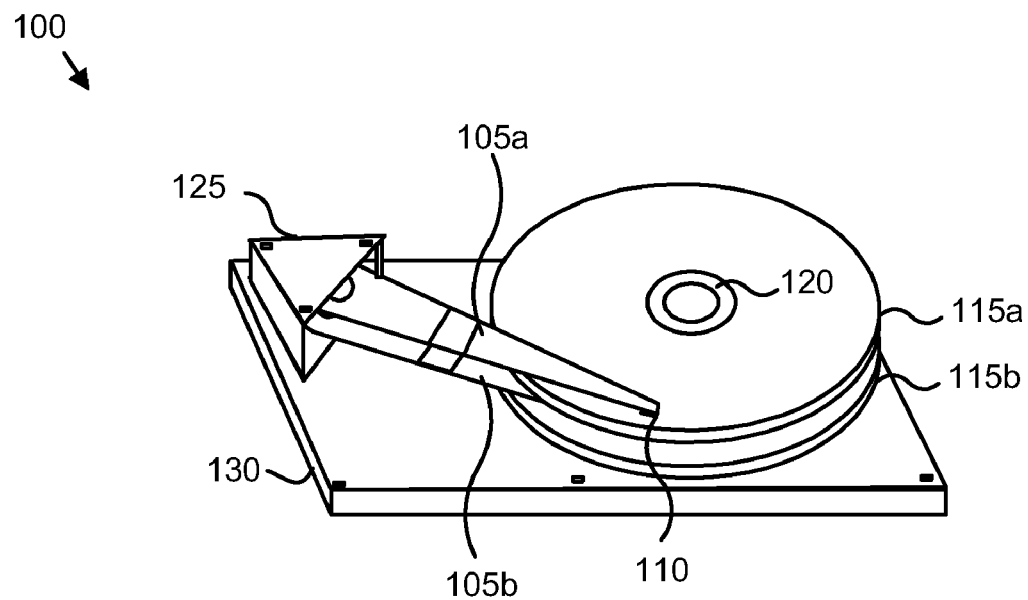
FIG. 1A is a perspective drawing illustrating one embodiment of an HDD in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1A is a perspective drawing illustrating one embodiment of an HDD 100 of the present invention. The HDD 100 includes one or more armatures 105, one or more heads 110, one or more disks 115, a spindle 120, a servo 125, and a base 130. Although for simplicity the HDD 100 is depicted with two disks 115, two armatures 105 with heads 110, and one servo 125, any number of disks 115, spindles 120, armatures 105, heads 110, and servos 125 may be employed.

The spindle 120 is operably connected to the base 130. The disks 115 are operably connected to the spindle 120. The spindle 120 is further configured to rotate the disks 115. The spindle 120 may be motivated by a motor as is well known to those skilled in the art.

As the disks 115 rotate, the servo 125 positions the armatures 105 and the heads 110 connected to the armatures 105 such that the heads are positioned on a specified radial area of the disks 115. The disks 115 comprise a magnetic material. The polarity of the magnetic material may be polarized by a magnetic field.

Figure 1B:
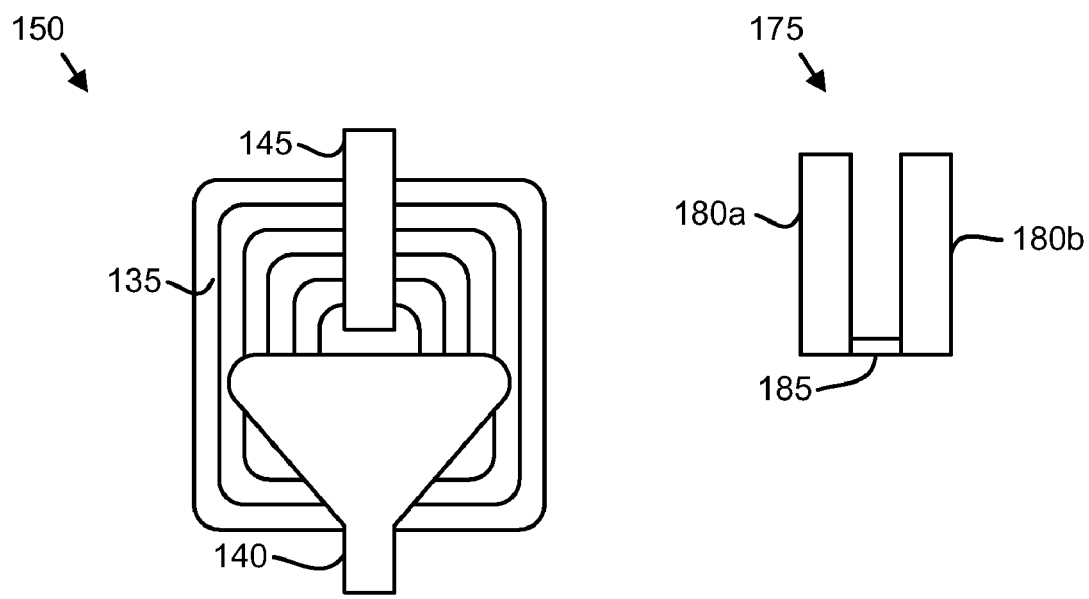
FIG. 1B is a side view drawing illustrating one embodiment of a write head and a read head in accordance with the present invention.

FIG. 1B is a side view drawing illustrating one embodiment of a write head 150 and a read head 175 of the present invention. The head 110 of FIG. 1A may embody the write head 150 and the read head 175. In one embodiment, the write head 150 and the read head 175 are disposed collinearly on the head 110.

The write head 150 includes a conductive coil 135, a field guide 140, and a support 145. A write signal that encodes binary digital data flows through the conductive coil 135. In one embodiment, the conductive coil 135 comprises a copper alloy. The write signal flowing through the conductive coil 135 creates a magnetic field. The field guide 140 directs the magnetic field to the disk 115 of FIG. 1A to polarize the magnetic material of the disk 115 as is well known to those skilled in the art.

The read head 175 includes at least two contacts 180 and a thin film media 185. The thin film media 185 senses the magnetic field of an area of the disk 115 and generates a read signal corresponding to the polarity of the magnetic field as is well known to those skilled in the art. The read signal flows through the contacts 180.

Figure 2:
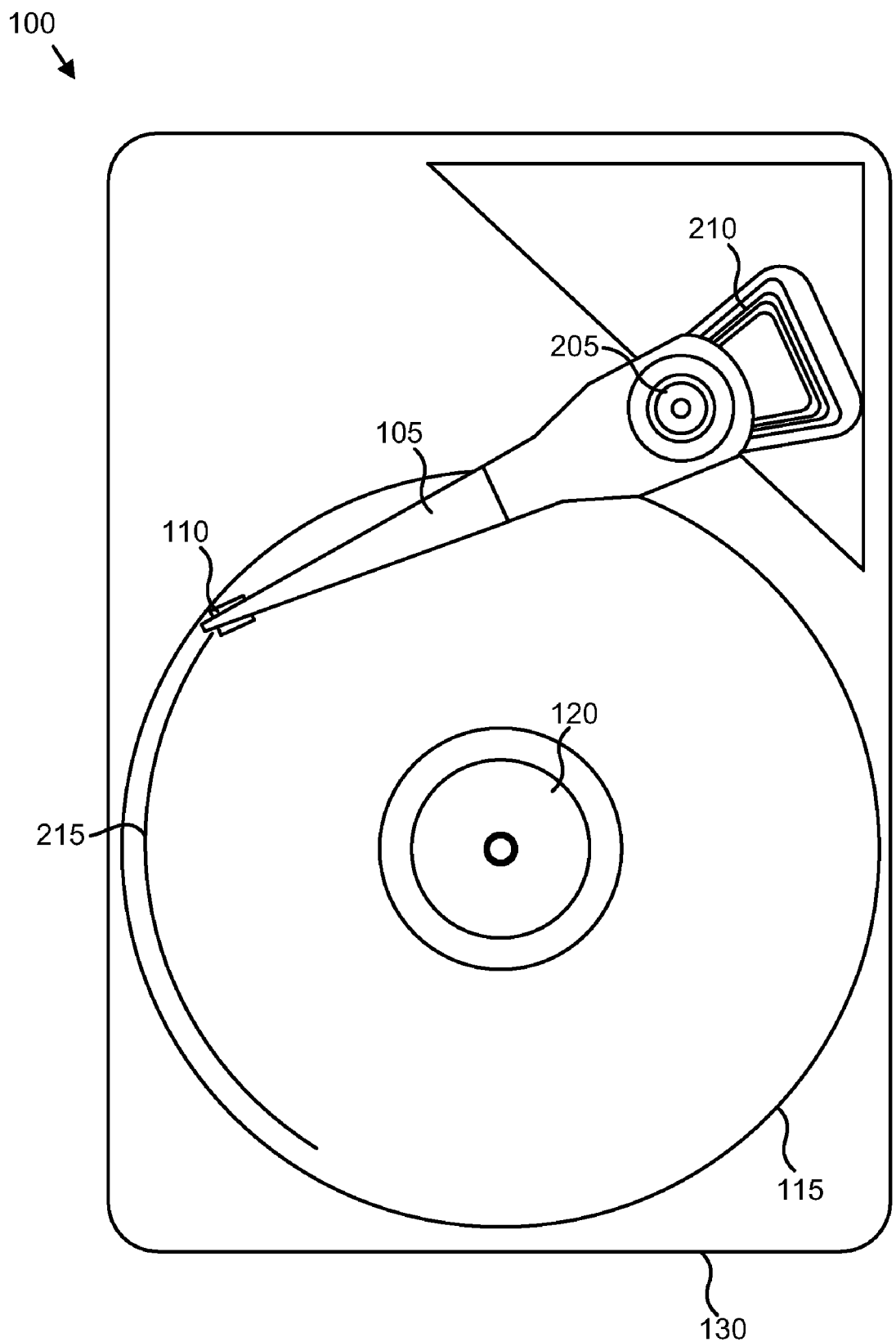
FIG. 2 is a top view drawing illustrating one embodiment of the HDD in accordance with the present invention.

FIG. 2 is a top view drawing illustrating one embodiment of the HDD 100 of FIG. 1A. The description of the HDD 100 refers to elements of FIGS. 1A and 1B, like numbers referring to like elements. An arc 215 is depicted on the disk 115. The arc 215 is representative of a plurality of arcs on the disk 115. The arc 215 may describe a circle around the disk 115. In one embodiment, the arc 215 is a portion of a land that will be described hereafter.

In addition, the servo 125 is depicted as a cut-away drawing to show a pivot 205 and a coil 210. The coil 210 motivates the armature 105 to rotate about the pivot 205 in response to a servo module that will be described hereafter. Thus the coil 210 positions the armature 105 and the head 110 over one or more arcs 215.

The write head 150 disposed on the head 110 writes magnetically encoded data to an arc 215 of the disk 115 by varying the polarity of the magnetic field in response to digital data. For example, the write head may create a magnetic field with a field vector oriented from the disk 115 in response to a binary digital value of zero (0), and may further create a magnetic field with a field vector oriented toward the disk 115 in response to a binary digital value of one (1). As the disk 115 rotates, the write head may write a string of binary digital values as encoded magnetic data to the arc 215 of magnetic material on the disk 115.

The read head 175 disposed on the head 110 senses the encoded magnetic polarities as the read head 175 passes over the arc 215 of magnetic material, generating a read signal. The magnetically encoded data sensed by the read head 175 is recovered from the read signal as is well known to those skilled in the art. For example, the read head 175 may sense a first area of the arc 215 with a first magnetic polarity and further sense a second area of the arc 215 with a second opposite magnetic polarity. The read head 175 generates a read signal with peaks of opposite electrical potential corresponding to the first and second area. The binary values of one (1) and zero (0) may be recovered from the read signal.

Figure 3:
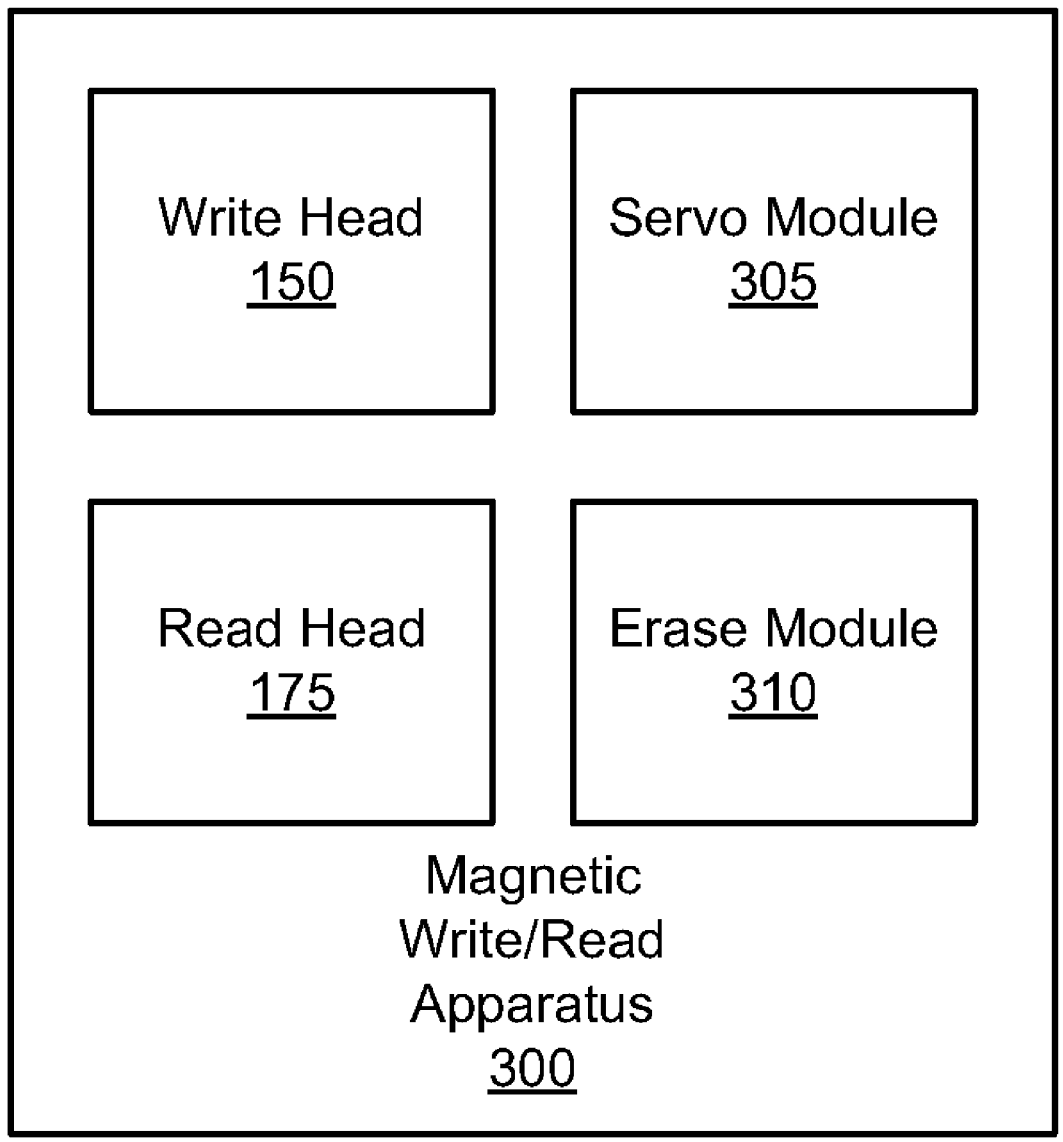
FIG. 3 is a schematic block diagram illustrating one embodiment of a magnetic write/read apparatus of the present invention.

FIG. 3 is a schematic block diagram illustrating one embodiment of a magnetic write/read apparatus 300 of the present invention. The apparatus 300 may be embodied by the HDD 100 of FIGS. 1A and 2. In addition, the description of the apparatus 300 refers to elements of FIGS. 1A-2, like numbers referring to like elements. The apparatus includes a write head 150, a servo module 305, a read head 175, and an erase module 310.

The write head 150 writes magnetically encoded data to a first land. The first land is disposed radially upon a disk 115 with a plurality of radially disposed lands as will be described hereafter. The first land may be configured as an arc 215 disposed upon the disk 115. The write head 150 has a radial width greater than the sum of a radial width of the first land and radial widths of an interior and exterior groove as will be described hereafter.

The servo module 305 positions the write head 150 relative to the first land such that a first edge of the write head 150 is positioned substantially over a first edge of the first land. In one embodiment, the servo module 305 includes the servo 125 of FIG. 1A along with the pivot 205 and coil 210 of FIG. 2. The write head 150 writes magnetically encoded data to the first land while positioned over the first land.

In one embodiment, the servo module 305 tracks a non-concentricity of a land. For example, if the arc 215 of a land is non-concentric, the servo module 305 may track the position of the land along the arc 215. The servo module 305 may also discover the position of a land. For example, the servo module 305 may read the data of the land while tracking the position of the land to discover the position of the land.

In one embodiment, the erase module 310 may perform a direct current ("DC") erase over a portion of a land. The erase module 310 may direct the write head to write a DC signal to the land, uniformly polarizing the magnetic material of the land. The servo module 305 may discover the position of the land by detecting the uniform polarity of the magnetic material of the land.

The read head 175 may read magnetically encoded data from the disk 115. In one embodiment, the servo module 305 positions the read head 175 in the center of a land. The width of the read head 175 may be less than or substantially equivalent to the radial width of a land plus one half the radial width of a groove The apparatus 300 writes data to a plurality of discrete lands using a write head 150 with a radial width larger than the radial width of the lands, supporting increased areal density.

Figure 4:
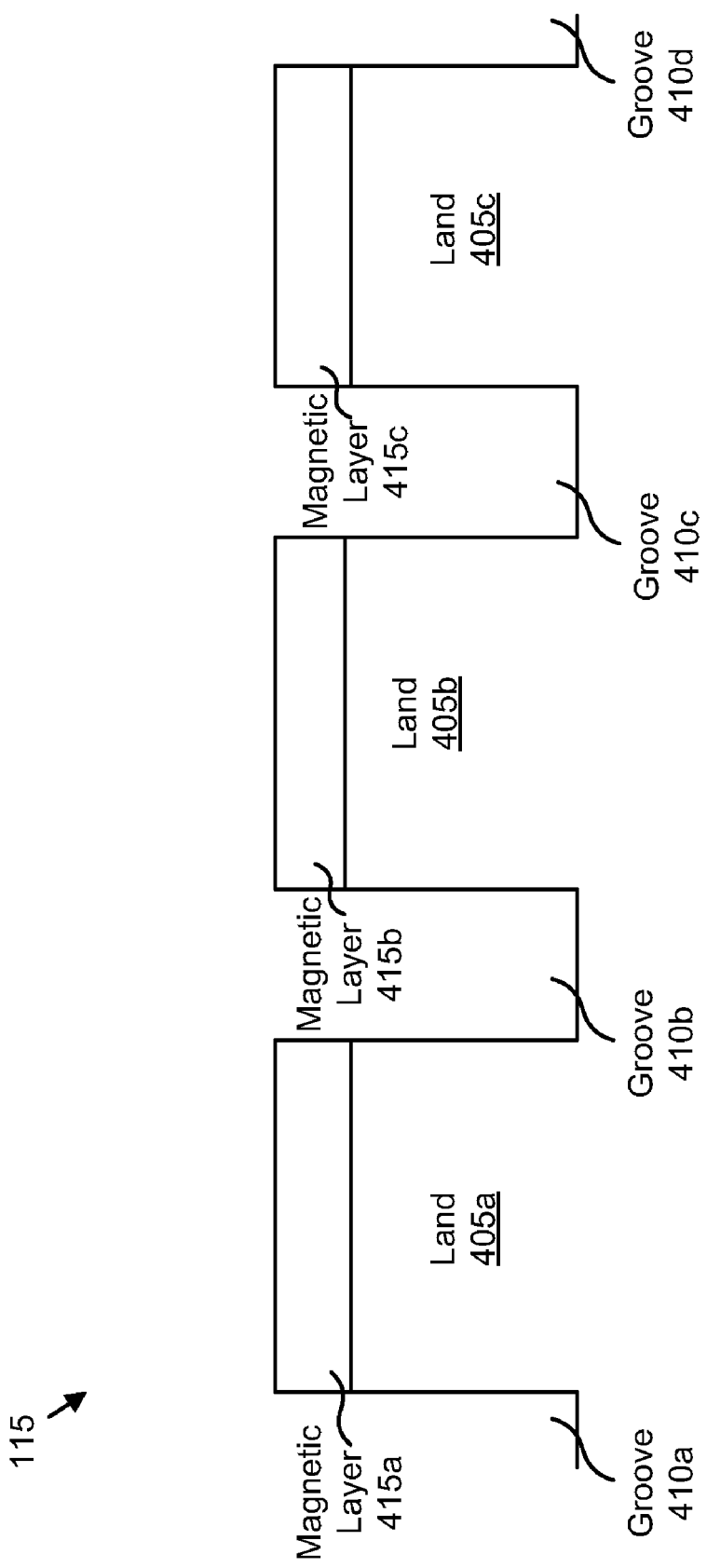
FIG. 4 is a cut-away drawing illustrating one embodiment of a disk of the present invention.

FIG. 4 is a cut-away drawing illustrating one embodiment of a disk 115 of the present invention. The disk 115 is the disk 115 of FIGS. 1A and 2. In addition, the description of the disk 115 refers to elements of FIGS. 1A-3, like numbers referring to like elements. The disk 115 includes a plurality of lands 405 and a plurality of grooves 410. Although for simplicity the disk 115 is shown with three lands 405 and four grooves 410, any number of lands 405 and grooves 410 may be employed. In addition, the radial width of the lands 405 and grooves 410 may vary from the ratios depicted. In a prophetic example, the radial width of a groove 410 may exceed the radial width of a land 405. The lands 405 and grooves 410 are disposed substantially radially upon the disk. In one embodiment, the lands 405 and grooves 410 form concentric circles on the disk 115. Alternatively, the lands 405 and grooves may form arcs 215 such as the arc 215 of FIG. 2.

In one embodiment, a magnetic material layer 415, referred to herein as a magnetic layer 415, is disposed on the land 405. The magnetic layer 415 is configured to align to a common magnetic polarity within an area in response to a magnetic field such as the magnetic field generated by the write head 150.

In one embodiment, the lands 405 and arcs 410 are lithographically formed. In a prophetic example, the magnetic layer 410 is applied to a disk 115 without lands 405 and grooves 410. A photoresist material may be applied to the disk 115. The photoresist may be exposed to electromagnetic radiation of a specified wavelength through a mask. The mask may be patterned to allow the radiation to pass where a land 405 is desired and block the radiation where a groove 410 is desired. The radiation may harden the photoresist where the glands 410 are desired. The unhardened photoresist may be etched away along with portions of the magnetic layer 415 and disk 115 to form the grooves 410. The hardened photoresist may further be removed without etching away the magnetic layer 415 of the lands 405.

Each land 405 is bounded by an interior radial groove 410 and an exterior radial groove 410. For example, a first land 405a is bounded by a first groove 410a and a second groove 410b. The first groove 410a may be an interior radial groove 410 while the second groove 410b may be an exterior groove 410. Alternatively, the first groove 410a may be the interior radial groove 410 and the second groove 410b may be the exterior groove 410. In one embodiment, each land 405 has a substantially equivalent radial width. Each groove 410 may also have a substantially equivalent radial width.

In an alternate embodiment, two or more lands 405 are grouped together as a lands group. The disk 115 may comprise a plurality of lands groups. In a certain embodiment, each lands group includes a boundary. The boundary may be a land 405. Alternatively, the boundary may be a groove. The radial width of the boundary may be at least the radial width of the write head 150 minus the width of the last land 405. In a certain embodiment, the boundary is one or more lands 405 and/or one or more grooves 410.

Figure 5:
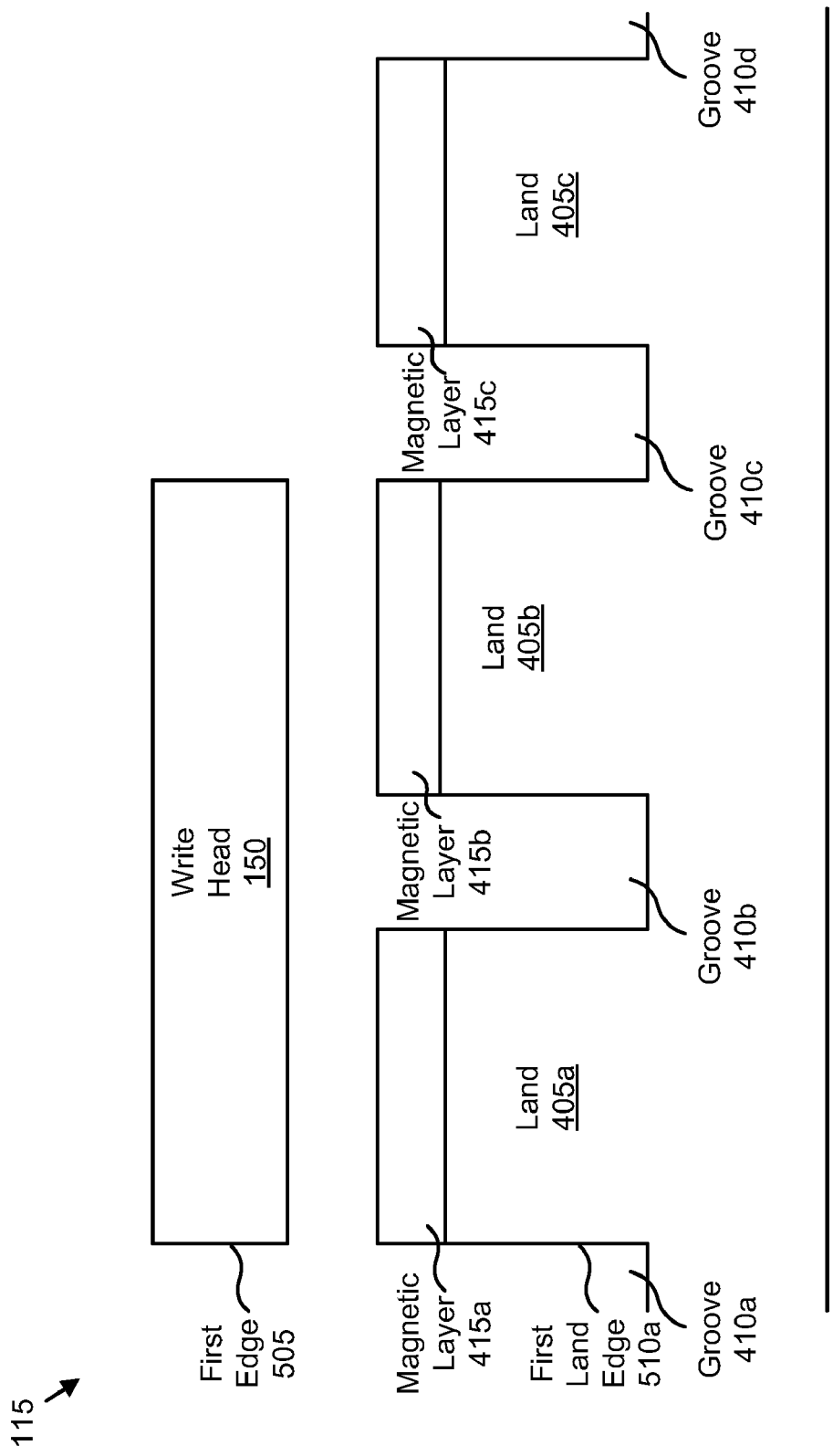
FIG. 5 is a cut-away drawing illustrating one embodiment of a disk and write head of the present invention.

FIG. 5 is a cut-away drawing illustrating one embodiment of a disk 115 and write head 150 of the present invention. The disk 115 is the disk 115 of FIGS. 1A, 2 and 4. The radial width of the portion of the write head 150 nearest the disk 115 is also depicted. For example, the depicted write head 150 may be the field guide 140 of FIG. 1B. The description of the disk 115 and write head 150 also refers to elements of FIGS. 1A-4, like numbers referring to like elements.

The write head 150 is depicted with a radial width that is substantially equivalent to the sum of the radial widths of two lands 405 and a groove 410. In one embodiment, the radial width of the write head 150 is in the range of the sum of the radial width of a land 405 and the radial widths of two grooves 410 such as an interior groove 410b and an exterior groove 410a to the sum of three times the radial width of the land 405 and the radial widths of two grooves 410 multiplied by two.

The servo module 305 positions the write head 150 relative to a first land 405a such that a first edge 505 of the write head 150 is positioned substantially over a first land edge 510a of the first land 405a. In an alternate embodiment, the first edge 505 of the write head 150 overlaps the first groove 510a. In a certain embodiment, the first edge 505 is set back from the first land edge 510a of the first land 405a.

In one embodiment, the first land edge 510a is oriented toward the interior of the disk 115, herein referred to as an interior edge. In an alternate embodiment, the first land edge 510a is oriented toward the exterior of the disk 115, herein referred to as an exterior edge.

The write head 150 is also positioned in whole or in part over a second land 405b adjacent to a second groove 410b bounding the first land 405a. The write head 150 writes the magnetically encoded data to at least a portion of the second land 405b while writing the magnetically encoded data to the first land 405a.

Figure 6:
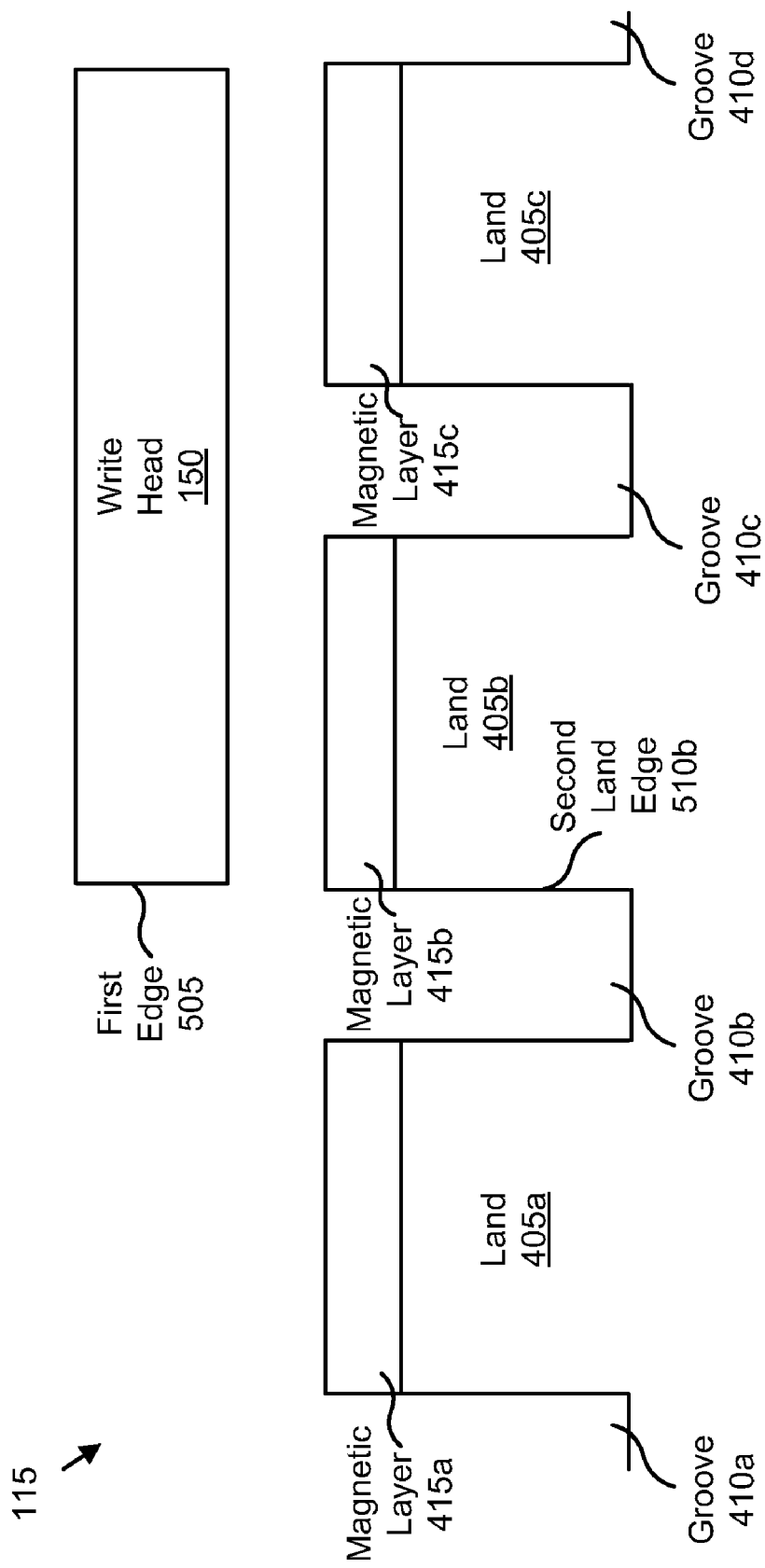
FIG. 6 is a cut-away drawing illustrating an alternate embodiment of a disk and write head of the present invention.

FIG. 6 is a cut-away drawing illustrating an alternate embodiment of the disk 115 and write head 150 of FIG. 5. In addition, the description of FIG. 6 references elements of FIGS. 1-5, like numbers referring to like elements.

The servo module 305 positions the write head 150 relative to the second land 405b such that the first edge 505 of the write head 150 is positioned substantially over a second land edge 510b of the second land 405b and the write head 150 is not positioned over a portion of the first land 405a. As positioned by the servo module 305, the write head 150 may overwrite data previously written to the second land 405*b*. The write head 150 does not overwrite data written to the first land 405*a*.

The servo module 305 may position the write head 150 over lands in a sequential order. In one embodiment, the first land 405*a* is disposed upon an inside diameter of the disk 115 relative to the second land 405*b*. Thus the write head 150 progresses from the inside diameter to an outside diameter during a write. Alternatively, the first land 405*a* may be disposed upon the outside diameter of the disk 115 relative to the second land 405*b* and the write head 150 progresses from the outside diameter to the inside diameter.

Figure 7:
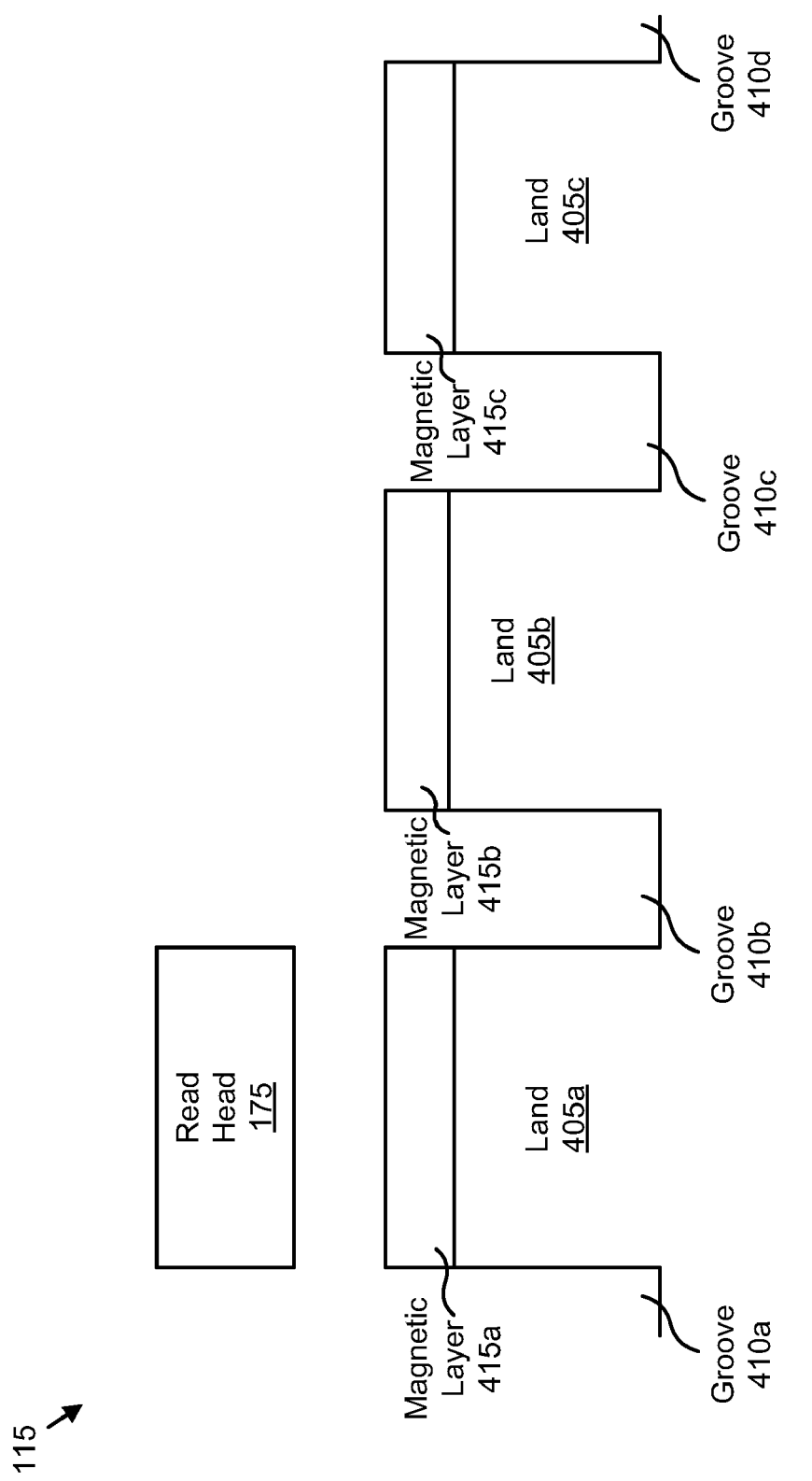
FIG. 7 is a cut-away drawing illustrating one embodiment of a disk and read head of the present invention.

FIG. 7 is a cut-away drawing illustrating one embodiment of a disk 115 and read head 175 of the present invention. The disk 115 is the disk 115 of FIGS. 1A, 2 and 4-6. The radial width of the read head 175 nearest the disk 115 is also depicted. The description of FIG. 7 refers to elements of FIGS. 1-7, like numbers referring to like elements.

The servo module 305 positions the read head 175 over the first land 405*a*. The radial width of the read head 175 is depicted as substantially equivalent to the radial width of the lands 405. In one embodiment, the radial width of the read head is less than or substantially equivalent to the radial width of a land 405 plus one half the radial width of a groove 410.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
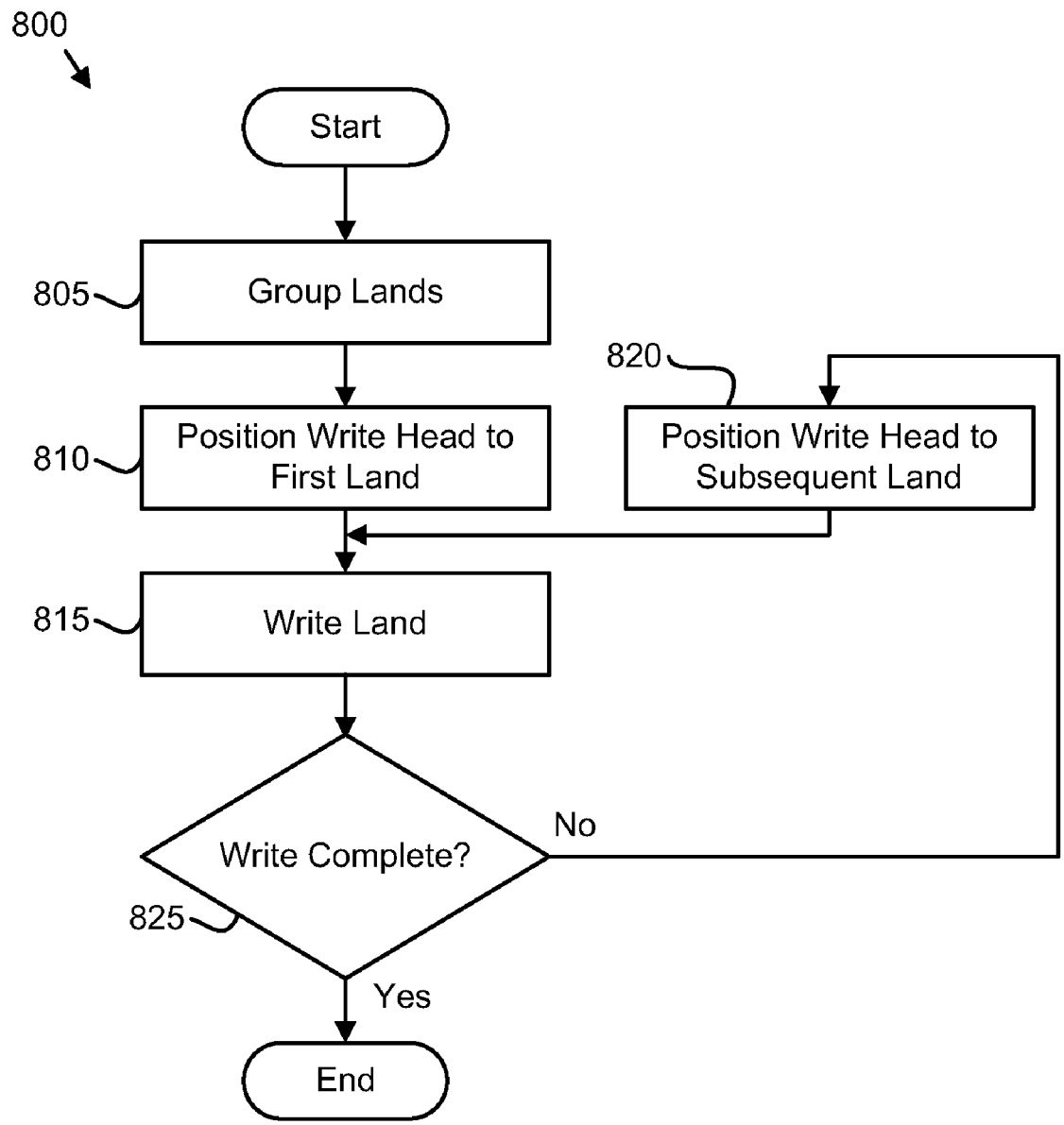
FIG. 8 is a schematic flow chart diagram illustrating one embodiment of a write method of the present invention.

FIG. 8 is a schematic flow chart diagram illustrating one embodiment of a write method 800 of the present invention. The method 800 substantially includes the steps to carry out the functions presented above with respect to the operation of the described apparatus and systems of FIGS. 1A-7. The description of the method 800 refers to elements of FIGS. 1A-7, like numbers referring to like elements.

The method 800 begins and in one embodiment, the servo module 305 groups 805 two or more lands 405 as a lands group. In addition, the servo module 305 may group 805 each land 405 of the disk 115 into a lands group of a plurality of lands groups. In one embodiment, a lands group comprises a boundary such as a land 405 and/or a groove 410. The boundary may be formed lithographically. In a certain embodiment, each lands group comprises a specified number of lands 405.

In an alternate embodiment, the number of lands 405 in a lands group may vary from lands group to lands group. For example, a first lands group may include twelve (12) lands 405 and a second lands group may include sixteen (16) lands 405. In one embodiment, one or more lands 405 and intervening grooves 410 are designated as the boundary. For example, for a write head 150 with a radial width substantially equivalent to two (2) lands 405 and an intervening groove 410 where each land 405 has a substantially equivalent radial width, and the servo module 305 positions the write head 150 to write lands 405 sequentially from an outside diameter land 405 to an inside diameter land 405, the two inner most lands 405 of the lands group may be configured as a boundary as will be described hereafter.

The servo module 305 positions 810 the write head 150 to a first land 405*a*. The first land 405*a* may be included in a lands group. The servo module 305 may position 810 the write head 150 relative to the first land 405*a* such that a first edge 505 of the write head 150 is positioned substantially over a first land edge 510*a* of the first land 405*a*.

The write head 150 writes 815 magnetically encoded data to the first land 405*a* as is well know to those skilled in the art. The write head 150 may write the data with an increased areal data compared with a write head 150 with a radial width that is substantially equivalent to the radial width of the first land 405*a*. In addition, the write head 150 may write the magnetically encoded data to one or more adjacent lands 405 such as the second adjacent land 405*b*.

The servo module 305 determines 825 if the write of data to the disk 115 is complete. If the write is complete, the method 800 terminates. If the servo module 305 determines the write of data to the disk 115 is not complete, the servo module 305 positions the write head 150 relative to the second land 405*b* such that the first edge 505 of the write head 150 is positioned substantially over a second land edge 510*b* of the second land 405*b* and the write head 150 is not positioned over a portion of the first land 405*a*.

The write head 150 writes magnetically encoded data to the second land 405*b*, overwriting the data written to the second land 405*b* by the write head 150 positioned over the first land 405*a*. The method 800 continues until the servo module 305 determines 825 that all data is written to the disk 115.

In one embodiment, the method 800 writes the magnetically encoded data to a specified number of lands 405 for each write to the disk 115. The specified number of lands 405 may be the number of lands 405 in a lands group. In a prophetic example, if each lands group includes ten (10) lands 405, the servo module 405 may write magnetically encoded data to ten (10) lands 405 for each write to the disk 115. If the lands group is capable of storing more data than is required for the data write, the servo module 305 may position the write head 150 to write buffer data to the lands group after writing the desired data. The buffer data may be a specified pattern of data such as all binary zeros (0).

Figure 9:
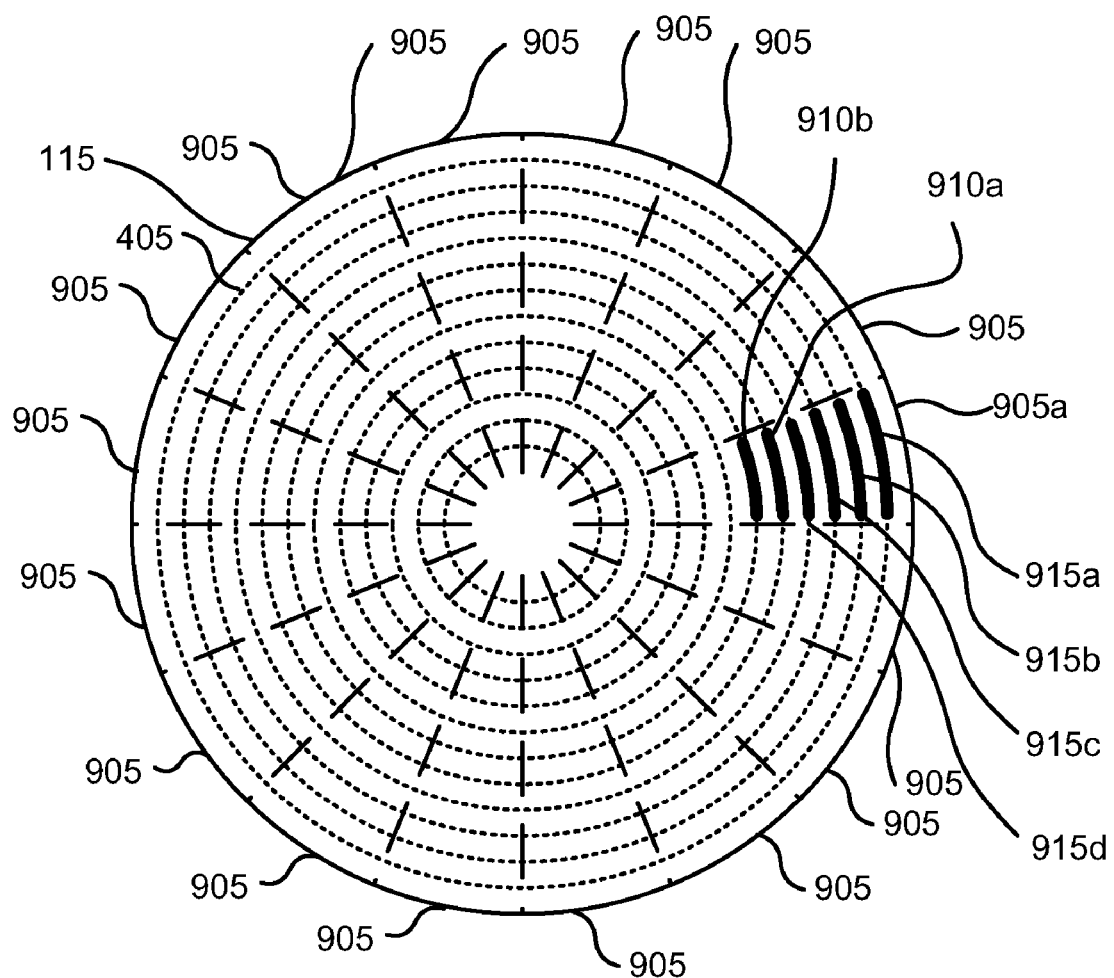
FIG. 9 is a schematic drawing illustrating one embodiment of a disk of the present invention.

FIG. 9 is a schematic drawing illustrating one embodiment of a disk 115 of the present invention. A plurality of lands 405 is depicted, although for simplicity, the lands 405 are not depicted to scale. The lands 405 are divided into sectors 905. The servo module 305 may group 805 one or more lands 910, 915 in a first sector 905*a* as a lands group. In one embodiment, the servo module 305 positions 810, 820 the write head 150 to write magnetically encoded data to the lands 910, 915 of the lands group sequentially from the outermost land 915*a*.

In one embodiment, the innermost two lands 915*a*, 915*b* are configured as a boundary. The radial width of the boundary may be substantially equivalent to the radial width of the write head 150 minus the width of the last land 915*b*. The servo module 305 may position 810, 820 the write head 150 to sequentially write 815 data to the lands 405 from the outermost first land 915*a* to a second land 915*b*, to a third land 915*c*, and to a fourth land 915*d*. In addition, the servo module 305 may position 820 the write head 150 to write data to the lands 915*a*, 915*b* comprising the boundary. Thus the write to the lands group does not overwrite data on a land 405 adjacent to the lands group.

The embodiment of the present invention writes magnetically encoded data to discrete lands 405 using a write head 150 with a radial width that at least exceeds the radial width of the lands 405. In addition, the embodiment of the present invention supports an increased areal density on each land 405.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to write magnetically encoded data, the apparatus comprising:
   a write head configured to write the magnetically encoded data to a first land, the first land disposed radially upon a disk and bounded by an interior radial groove and an exterior radial groove, and wherein the write head has a radial width greater than the sum of a radial width of the first land and radial widths of the interior and exterior grooves; and
   a servo module configured to position the write head relative to the first land such that a first edge of the write head is positioned substantially over a first land edge of the first land.

2. The apparatus of claim 1, wherein the servo module is further configured to position the write head relative to a second land adjacent to a groove bounding the first land such that the first edge of the write head is positioned substantially over a second land edge of the second land and the write head is not positioned over a portion of the first land.

3. The apparatus of claim 1, further comprising a read head configured to read the magnetically encoded data, wherein a radial width of the read head is less than or substantially equivalent to the radial width of a land plus one half the radial width of a groove.

4. The apparatus of claim 1, wherein the write head radial width is in the range of the sum of the radial width of the first land and the radial widths of the interior and exterior grooves to the sum of three times the radial width of the first land and the radial widths of the interior and exterior grooves multiplied by two.

5. The apparatus of claim 1, wherein the servo module is further configured to track a non-concentricity of the first land and discover the position of the first land.

6. The apparatus of claim 5, further comprising an erase module configured to perform a direct current ("DC") erase over the first land and wherein the servo module discovers the position of the erased first land.

7. The apparatus of claim 1, wherein a plurality of lands is grouped as a lands group such that the lands of the lands group are sequentially written together.

8. The apparatus of claim 7, wherein a first lands group is separated from a second lands group by a boundary with a radial width at least substantially equivalent to the radial width of the write head minus the width of the last land, the boundary selected from a land and a groove.

9. The apparatus of claim 1, wherein the first edge of the write head overlaps a groove.

10. The apparatus of claim 1, wherein the first edge of the first land is selected from an interior edge and an exterior edge.

11. The apparatus of claim 1, wherein each land has a substantially equivalent radial width and each groove has a substantially equivalent radial width.

12. The apparatus of claim 1, wherein the lands and grooves are formed lithographically.

13. The apparatus of claim 1, wherein the servo module is further configured to position the write head over lands in a sequential order.

14. The apparatus of claim 1, wherein a plurality of adjacent lands are written sequentially from an inside diameter to an outside diameter.

15. The apparatus of claim 1, wherein a plurality of adjacent lands are written sequentially from an outside diameter to an inside diameter.

16. A signal bearing medium tangibly embodying a program of machine-readable instructions executable by a digital processing apparatus to perform an operation to write magnetically encoded data, the operation comprising:
   positioning a write head relative to a first land such that a first edge of the write head is positioned substantially over a first land edge of the first land, the first land disposed radially upon a disk and bounded by an interior radial groove and an exterior radial groove, and wherein the write head has a radial width greater than the sum of a radial width of the first land and radial widths of the interior and exterior grooves; and
   writing the magnetically encoded data to the first land;
   positioning the write head relative to a second land adjacent to a groove bounding the first land such that the first edge of the write head is positioned substantially over a second land edge of the second land and the write head is not positioned over a portion of the first land.

17. The signal bearing medium of claim 16, wherein the write head radial width is in the range of the sum of the radial width of the first land and the radial widths of the interior and exterior grooves to the sum of three times the radial width of the first land and the radial widths of the interior and exterior grooves multiplied by two.

18. The signal bearing medium of claim 16, wherein the instructions further comprise an operation to track a non-concentricity of the first land.

19. The signal bearing medium of claim 18, wherein the instructions further comprise an operation to discover the position of the first land.

20. The signal bearing medium of claim 19, wherein the instructions further comprise an operation to perform a DC erase over the first land and discover the position of the erased first land.

21. The signal bearing medium of claim 20, wherein a plurality of lands is grouped as a lands group such that the lands of the lands group are sequentially written together and wherein a first lands group is separated from a second lands group by a boundary with a radial width at least substantially equivalent to the radial width of the write head minus the width of the last land, the boundary selected from a land and a groove.

22. A system to write magnetically encoded data, the system comprising:
   a disk comprising a plurality of lands disposed radially on the disk, each land bounded by an interior radial groove and an exterior radial groove and wherein each land has a substantially equivalent radial width and each groove has a substantially equivalent radial width;
   a write head configured to write the magnetically encoded data to a first land, and wherein the write head has a radial width in the range of the sum of the radial width of the first land and the radial widths of adjacent interior and exterior grooves to the sum of three times the radial width of the first land and the radial widths of the adjacent interior and exterior grooves multiplied by two; and a servo module configured to position the write head relative to the first land such that a first land edge of the write head is positioned substantially over a first edge of the first land and position the write head relative to a second land adjacent to a groove bounding the first land such that the first edge of the write head is positioned substantially over a second land edge of the second land and the write head is not positioned over a portion of the first land.

23. The system of claim 22, further comprising a read head configured to read the magnetically encoded data, wherein a radial width of the read head is less than or substantially equivalent to the radial width of a land plus one half the radial width of a groove.

24. The system of claim 23, wherein a plurality of lands is grouped as a lands group such that the lands of the lands group are sequentially written together and wherein a first lands group is separated from a second lands group by a boundary with a radial width at least equivalent to the radial width of the write head minus the width of the last land, the boundary selected from a land and a groove.

25. A method for writing magnetically encoded data, the method comprising:

grouping lands of a plurality of lands as lands groups, wherein each land is disposed radially on a disk and bounded by an interior radial groove and an exterior radial groove, each lands group is sequentially written together, and wherein a first lands group is separated from a second lands group by a boundary with a radial width at least equivalent to the radial width of the write head minus the width of the last land, the boundary selected from a land and a groove;

sequentially positioning a write head relative to each land of the first group of lands beginning with an outermost land such that a first edge of the write head is positioned substantially over a first land edge of each land, and wherein the write head has a radial width greater than the sum of a radial width of the first land and radial widths of the interior and exterior grooves;

sequentially writing the magnetically encoded data to each land of the lands group and at least a portion of an adjacent land;

positioning the write head relative to a boundary land such that the first edge of the write head is positioned substantially over a first land edge of the boundary land and the write head is not positioned over an adjacent land; and writing the magnetically encoded data to the boundary land.

* * * * *